United States Patent [19]

Kouyama et al.

[11] Patent Number: 4,671,374
[45] Date of Patent: Jun. 9, 1987

[54] MAIN STAND DEVICE FOR TWO-WHEELED MOTORCYCLE

[75] Inventors: Mikihiro Kouyama, Saitama; Akio Yagasaki, Tokyo, both of Japan

[73] Assignee: Honda Giken Kogyo Kabushiki Kaisha, Tokyo, Japan

[21] Appl. No.: 759,601

[22] Filed: Jul. 26, 1985

[30] Foreign Application Priority Data

Jul. 26, 1984 [JP] Japan .................... 59-155906

[51] Int. Cl.⁴ .............................. B62M 1/02
[52] U.S. Cl. .................... 180/219; 280/301; 280/303
[58] Field of Search ............ 180/219; 280/289 G, 280/289 R, 293, 301, 303

[56] References Cited

U.S. PATENT DOCUMENTS 4,223,906  9/1980  Gratza ...................... 180/219

FOREIGN PATENT DOCUMENTS 756515  12/1933  France ...................... 280/301

Primary Examiner—John J. Love
Assistant Examiner—Donn McGiehan
Attorney, Agent, or Firm—Lyon & Lyon

[57] ABSTRACT

A main stand device for a two-wheeled motorcycle having a body frame, which comprises a main stand pivotally secured to the body frame for rotation between a stored state and a standing state, an actuator operatively coupled with the main stand and operably provided on the body frame for manually rotating the main stand, the main stand being fixedly secured to a rotational shaft rotatably supported on the body frame, a drive source coupled to the rotational shaft so as only to transmit a drive force from the source to the shaft for rotatably driving the shaft, the drive source being constructed to start its operation for rotating the main stand in a direction toward its standing state in response to the operation of the actuator which is operated to rotate the main stand from the stored state to a position in contact with the ground or immediately before contact with the ground. Thus, the main stand device can operate to rotate the main stand manually in a range where a small operating force is required therefore and rotate the stand by means of both the force of a drive source and the manual force or only by the drive force when a large operating force is required, thereby bringing the main stand into a standing position with small operating force in a short period of time.

10 Claims, 22 Drawing Figures

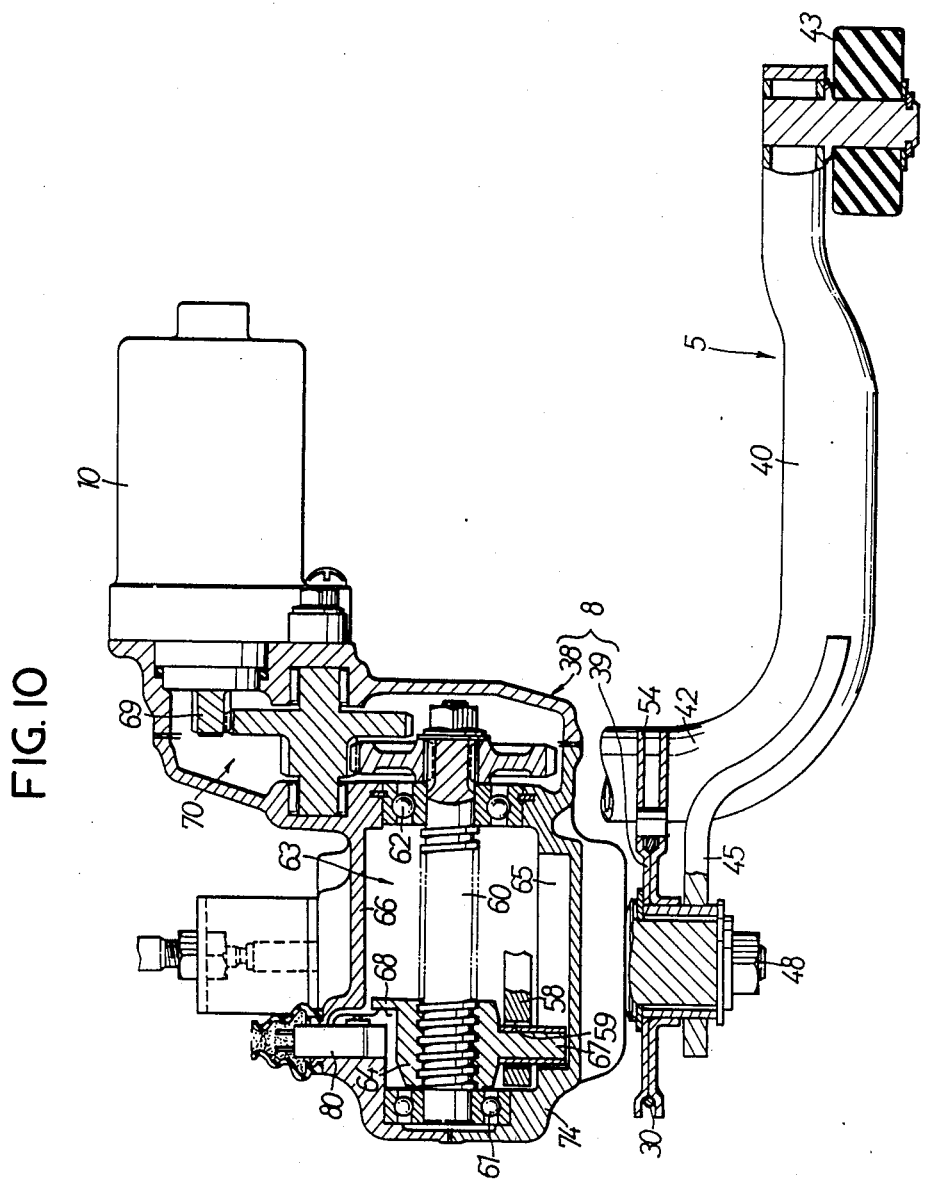

MAIN STAND DEVICE FOR TWO-WHEELED MOTORCYCLE

BACKGROUND OF THE INVENTION

1. Field of the Invention

The present invention relates to a main stand device for a two-wheeled motorcycle and, more particularly, to a device which has a main stand secured to a body frame in a manner pivotable between a stored state and a standing state, and actuator operably mounted at the body frame for allowing the main stand to be pivoted by a manual force.

2. Description of the Prior Art

In a conventional two-wheeled motorcycle such as a two-wheeled scooter, a body frame is entirely protected by a cover so that the presence of a main stand is unclear to a driver and he or she may sometimes be at a loss how to reach the main stand for standing operation. To this end, Japanese Patent Publication Kokoku No. 14015/1960 and Japanese Utility Model Publication Kokoku No. 1533/1961 propose devices for standing a main stand by manually operating an actuator disposed at an evident position. In this prior art, a driver may not be at a loss how to reach the main stand, but if the two-wheeled motorcycle is heavy, a large operating force is required.

A conventional technique for mechanically operating a main stand by an electric motor is already disclosed in Japanese Patent Publication Kokoku No. 12158/1962 and Japanese Utility Model Publication Kokai No. 107761/1976. In this main stand device, only a small operating force may be required for bringing a main stand from its stored state to a position in contact with the ground, but the motor is used also for such standing operation of the main stand, taking a long time and hence consuming large power. On the other hand, if the drive force of the motor is transmitted at a small gear ratio to the main stand so as to shorten the time of standing operation, a large force necessary to raise and stand the two-wheeled motorcycle after the main stand contacts with the ground cannot be obtained.

SUMMARY OF THE INVENTION

It is, therefore, an object of the present invention to provide a main stand device for a two-wheeled motorcycle which can eliminate the aforementioned drawbacks and disadvantages and which can actuate a main stand manually in a range where only a small operating force is necessitated therefor and can actuate the stand by both the drive force of a drive source and the manual force or only by the drive force when a large operating force is required, thereby bringing the main stand into a standing state with use of a small operating force in a short period of time.

According to the present invention, there is provided a main stand device for a two-wheeled motorcycle in which a main stand is fixedly secured to a rotational shaft rotatably supported on a body frame, the shaft and a drive source for rotatably driving the shaft are coupled together so as only to transmit power from the drive source to the shaft and in which the drive source is constructed to start its operation of rotating in a direction toward the standing state in response to the operation of an actuator which is operated to rotate the main stand from its stored state to a position in contact with the ground or immediately before contact with the ground.

When the actuator is operated in order to rotate the main stand from the stored state to the standing state, the rotational shaft is operated for effecting such rotation of the main stand. During this operation, the rotation of the shaft is not transmitted to the drive source, but the shaft can freely rotate. When the main stand is rotated to a position in contact with the ground or immediately before contact with the ground, the operation of the drive source is started to transmit its drive force to the rotational shaft. Therefore, after the drive source starts operating, the main stand is brought into a standing position by both the manual force and the force of the drive source or only the force of the drive source.

The above and other advantages, features and additional objects of the present invention will become apparent by those skilled in the art from reading of the following detailed description of the embodiments in reference to the accompanying drawings.

BRIEF DESCRIPTION OF THE DRAWINGS

FIG. 10 is a sectional view, taken along the line X—X of FIG. 8;

FIGS. 20 to 22 are views showing still another embodiment of the present invention; wherein FIG. 20 shows a side view of the essential portion; FIGS. 21 and 22 are side views corresponding to FIG. 20 showing the operating state.

DESCRIPTION OF THE PREFERRED EMBODIMENTS

Figure 1:
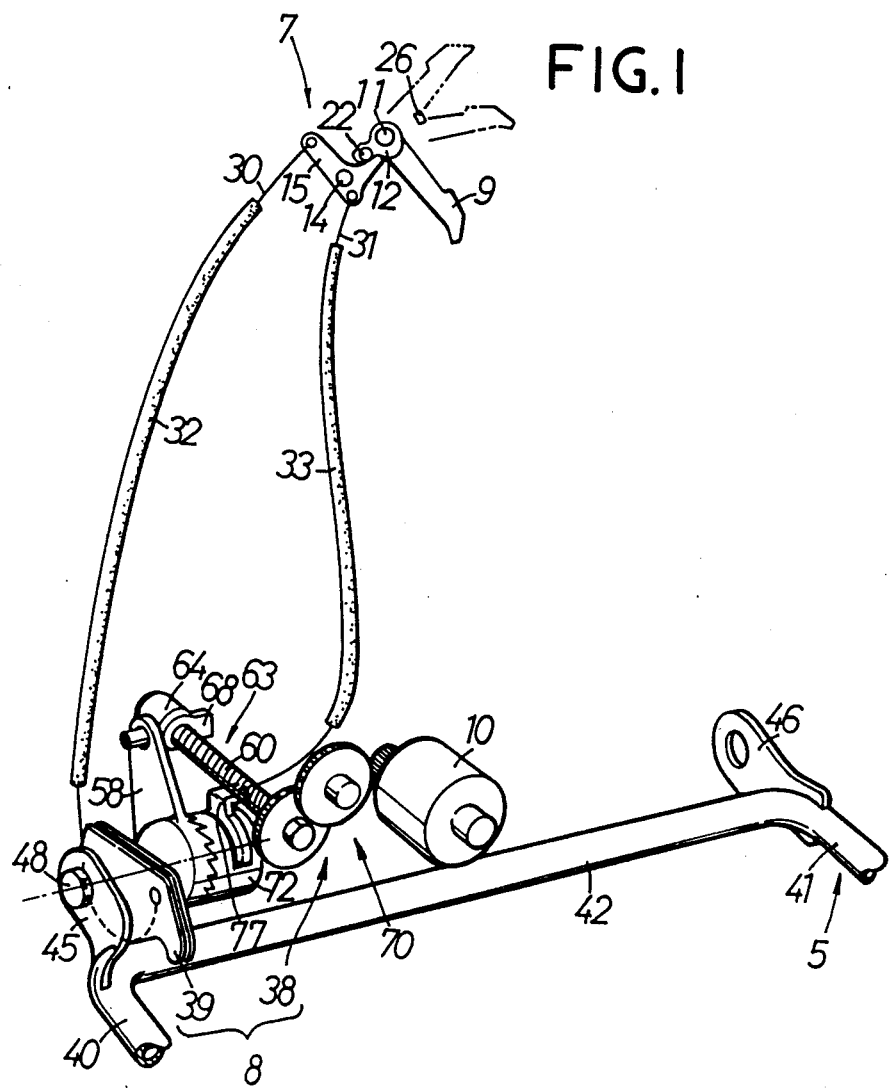
FIG. 1 is a perspective view of a simplified entire construction of a first embodiment of a main stand device for a two-wheeled motorcycle according to the present invention.
Figure 2:
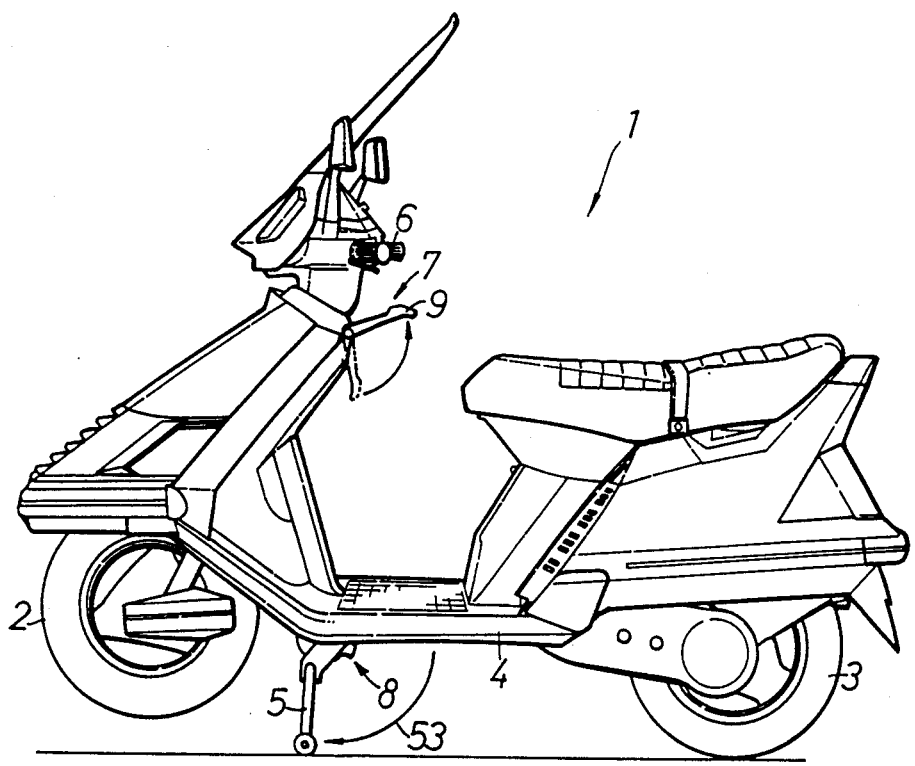
FIG. 2 is a side view of a scooter carrying the main stand device of the present invention.

Embodiments of the present invention will now be described in more detail with reference to the accompanying drawings. In FIGS. 1 and 2, showing a first embodiment of the invention applied to a scooter, a main stand 5 is arranged in the vicinity of a front wheel 2 at the lower portion of a body frame 4 between the wheel 2 and a rear wheel 3 of a scooter 1 as a two-wheeled motorcycle. When the main stand 5 is stood, the scooter 1 is maintained in a stable stopped state with the rear wheel 3 being in contact with the ground and the front wheel 2 being raised from the ground surface.

A drive unit 7 is disposed on the body frame 4 under a steering handle 6 at a position where a driver can readily manually operate. The main stand 5 is coupled with an operation unit 8 arranged at the lower portion of the frame 4. The drive unit 7 and the operation unit 8 are operatively coupled together and by lifting an operating lever 9 as an actuator provided in the drive unit 7 in a direction as designated by an arrow in FIG. 2 the operation unit 8 is operated. Thus, the main stand 5 is rotated by a manual power in a range where a relatively small operating force may be sufficient for moving the main stand 5 from its state stored below the body frame 4 to a position in contact with the ground, and is rotatably driven by both the manual power and the drive force of a motor 10 as a drive source in a range requiring large operating force from the contact state of the main stand with the ground to the position in which the main stand is in the standing state as shown in FIG. 2.

Figure 3:
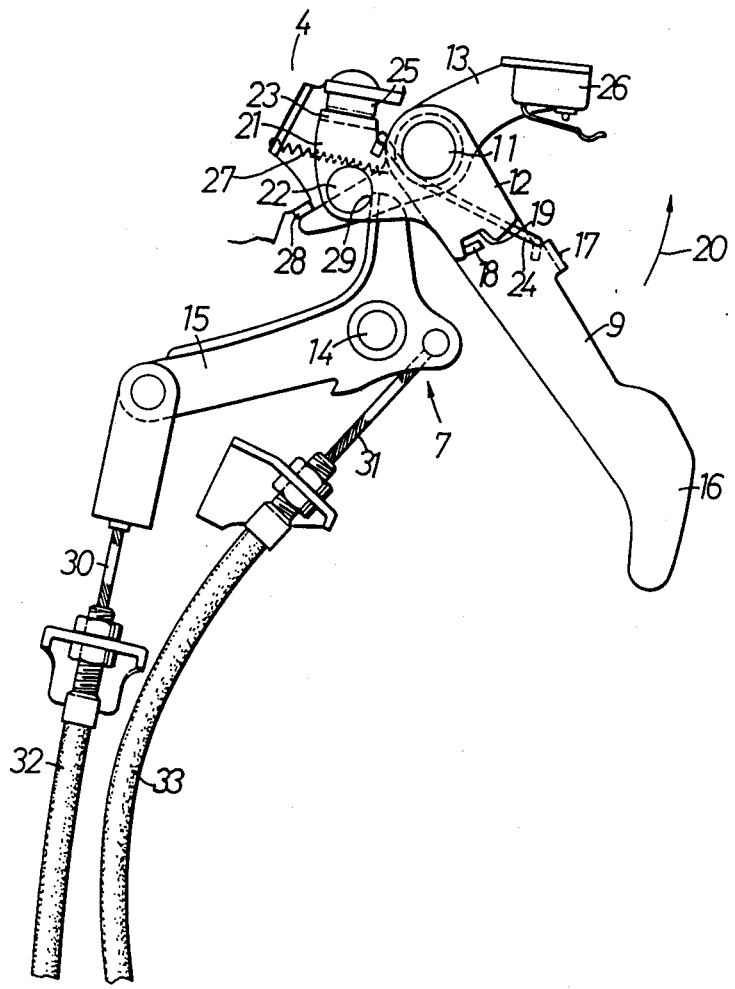
FIG. 3 is an enlarged side view showing the construction of a drive unit of the main stand device.

In FIG. 3, the drive unit 7 has a supporting shaft 11 extending laterally of the scooter 1 and fixed to the frame 4, an operating lever 9 pivotally secured to the shaft 11, a sub lever 12 pivotally secured to the shaft 11, a switch arm 13 pivotally secured to the shaft 11, a shaft 14 fixed on the frame 4 in parallel with and below the shaft 11, and a link arm 15 pivotally secured to the shaft 14.

The lever 9 is extended from the shaft 11 along the longitudinal direction of the scooter 1 toward the rear side, and a grip 16 to be grasped by a hand is formed at the movable end of the lever 9. A contacting projection 17 projected sidewise is formed at an upper side of intermediate portion of the lever 9, and an engaging projection 18 is projected at one side of the lever 9 closer to the shaft 11 than the projection 17.

The sub lever 12 is extended to the position corresponding to the projection 18 in the same direction as the lever 9, a notch 19 to be engaged with the projection 18 is formed at the movable end of the sub lever 12 in such a manner that the width of the notch 19 and hence its distance along the circumferential direction with the shaft 11 serving as a center is set larger than the width of the projection 18. A projection 21 projected at the rear side of the lever 9 along the rotating direction 20 for standing the main stand 5 is integrally formed with the lever 12, and a roller 22 capable of rotating around an axis parallel with the shaft 11 is supported to the projection 21. A stopper 23 projected sidewise is integrally formed with the final end of the projection 21 along the rotating direction 20.

A torsion spring 24 is wound around the shaft 11, the spring 24 is engaged at one end with the lever 12 and at the other end with the lever 9. When the lever 9 is rotated, the lever 12 is driven in the rotating direction 20 through the spring 24. The lever 12 is disposed at the position where the stopper 23 is abutted against an elastic piece 25 provided on the frame 4 and hence at a rearmost position along the rotating direction 20 when the lever 9 is disposed at its lowermost position as shown in FIG. 3. In this state, the projection 18 of the lever 9 is in contact with the rear end of the notch 19 along the rotating direction 20.

The switch arm 13 is extended at both sides substantially along one diametral line of the shaft 11, and a motor switch 26 is fixedly supported at one end thereof so as to be turned on when coming in contact with the projection 17 of lever 9. A spring 27 for urging the switch arm 13 rearward along the rotating direction 20 is extended between the arm 13 and the frame 4. Therefore, the switch arm 13 is disposed at the rearmost position along the rotating direction 20 when the lever 9 is not operated, and the arm 13 is in contact at its other end with an elastic piece 28 provided on the frame 4 to be held in place.

A contacting portion 29 which abuts against the roller 22 of the lever 12 at the front side along the rotating direction 20 is integrally formed with the link arm 15, and the arm 15 is rotated around the shaft 14 in response to the rotation of the lever 12. A first cable 30 is coupled to one end of the arm 15 for manual rotation of the main stand 5, and a second cable 31 is coupled to the other end of the arm 15 for enabling the drive force of the motor 10 to be used for the standing operation of the main stand 5. The first and second cables 30, 31 are movably inserted into the outer cables 32, 33 supported on the frame 4, and are extended to the operation unit 8. The cable 30 is coupled with the arm 15 so as to be towed in response to the rotation of the lever 9 in the rotating direction of the lever, and the cable 31 is coupled with the arm 15 so as to move reversely of the cable 30.

In the drive unit 7, in order to stand the main stand 5 which is in the stored state, the grip 16 of the lever 9 of the state shown in FIG. 3 is manually grasped and pulled upward. The rotating operation of the lever 9 is transmitted through the twisted spring 14 to the lever 12, and the lever 12 is driven in the rotating direction. In this case, the projection 18 is not contacted with the front end of the notch 19 in the rotating direction 20, and the tension of the spring 14 is set to allow such relationship between the projection 18 and notch 19. The arm 15 is rotated by the roller 22 in response to the rotation of the lever 12, the cable 30 is pulled upward, and the cable 31 is moved down. The lift of the cable 30 is converted into the rotating movement of the main stand 5 from its stored state as will be described with respect to the operation unit 8.

Figure 4:
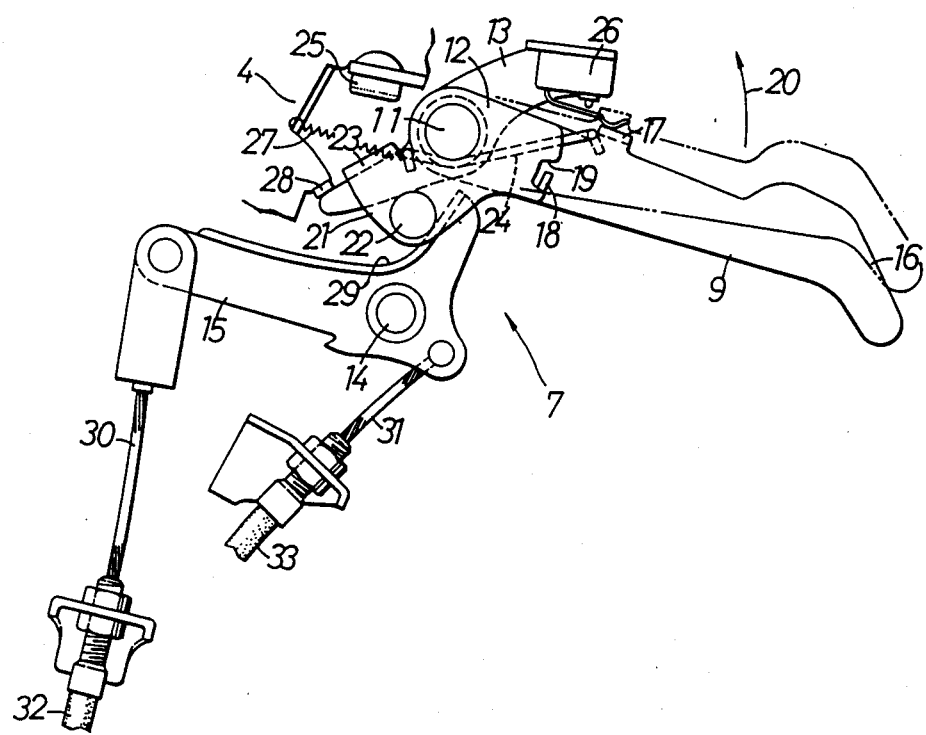
FIGS. 4 and 5 are enlarged side views showing the variation in the operating state of the drive unit corresponding to FIG. 3.

The lever 9 is disposed substantially in a horizontal attitude as designated by solid lines in FIG. 4 in the state where the main stand 5 is contacted with the ground, and the stopper 23 of the lever 9 is engaged with the arm 13. In this case, as the rotating resistance of the main stand 5 increases, the rotating resistance of the lever 12 increases through the cable 30 and the arm 15. The projection 17 of the lever 9 comes into contact with the switch 26. When the lever 9 is further pulled upward, the spring 24 is deflected, and the lever 9 relatively rotates with respect to the lever 12 until the projection 18 is placed in contact with the front end of the notch 19 along the rotating direction 20. Accordingly, while the lever 12 and the arm 13 remain stationary, the lever 9 is rotated to the position designated by chain lines in FIG. 4, and the switch 26 is thus conducted. In this case, in the operation unit 8, the drive force of the motor 10 can be utilized for the rotating operation of the main stand 5, and the drive force of the motor 10 is utilized for standing the main stand 5 by the conduction of the switch 26.

Figure 5:
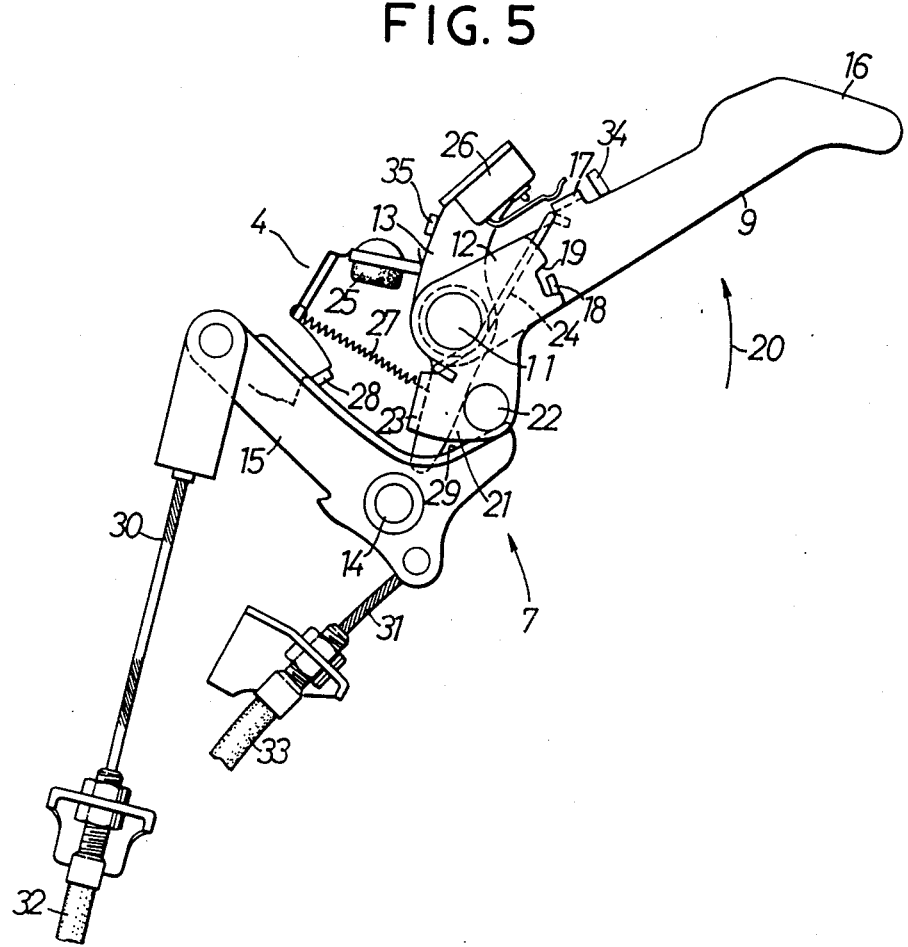

When the lever 9 is further pulled upward in the rotating direction 20, a rotary force is transmitted to the lever 12 through the projection 18, and a rotary force is further transmitted to the arm 13 through the stopper 23. Accordingly, the levers 9, 12 and the arm 13 are integrally rotated toward the rotating direction 20, and the conducted state of the switch 26 is maintained. As shown in FIG. 5, when the lever 9 is pulled upward until the lever 9 is contacted with a stopper 34 provided on the frame 4, the main stand 5 is rotated to the erected state to complete the standing operation. In this case, the tension of the cable 30 decreases as will be described later, and the lever 12 rotates relatively to the lever 9 to the original state, i.e., to the position where the rear end of the notch 19 along the rotating direction 20 is contacted with the projection 18 of the lever 9 by the tension of the spring 24. Thus, the arm 13 is slightly rotated by the stopper 23 toward the forward direction along the rotating direction 20, and the switch 26 is interrupted. In order to stop rotating the arm 13 any further, a stopper 35 is formed on the frame 4 to contact with the arm 13.

Figure 6:
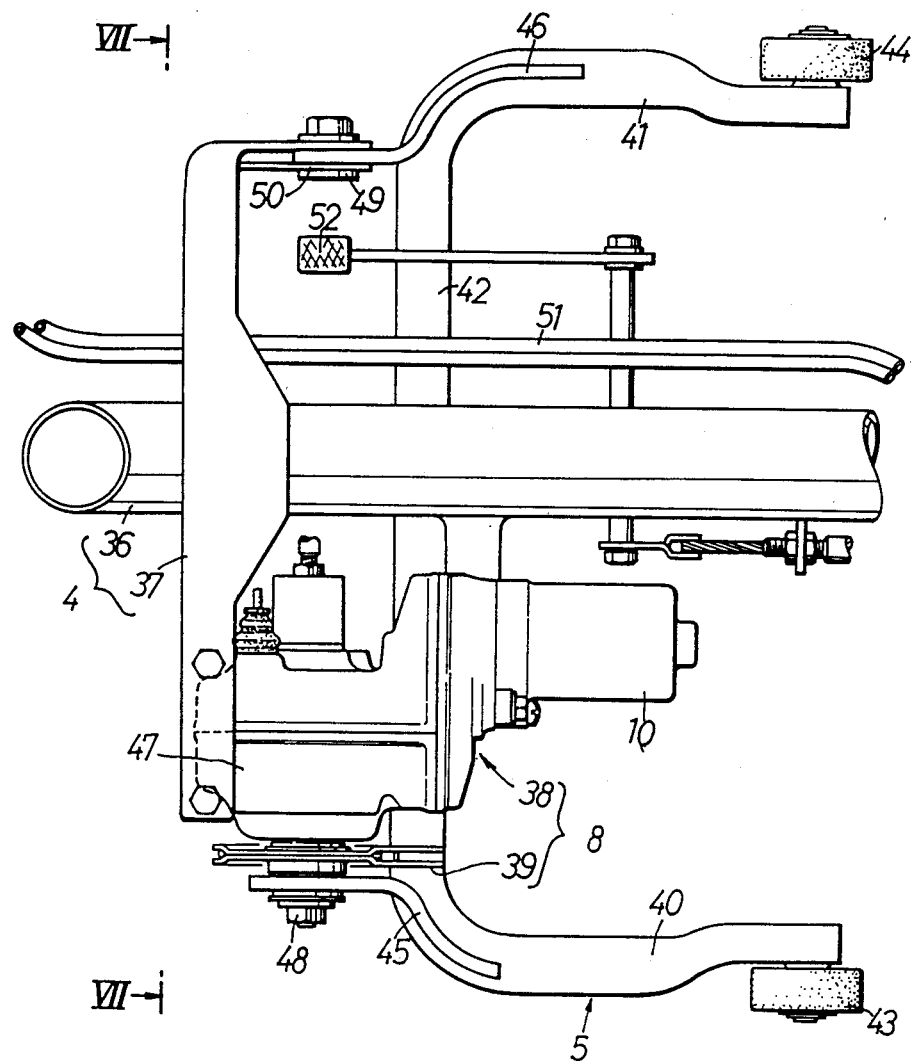
FIG. 6 is an enlarged plan view showing the mounted state of the drive unit.
Figure 7:
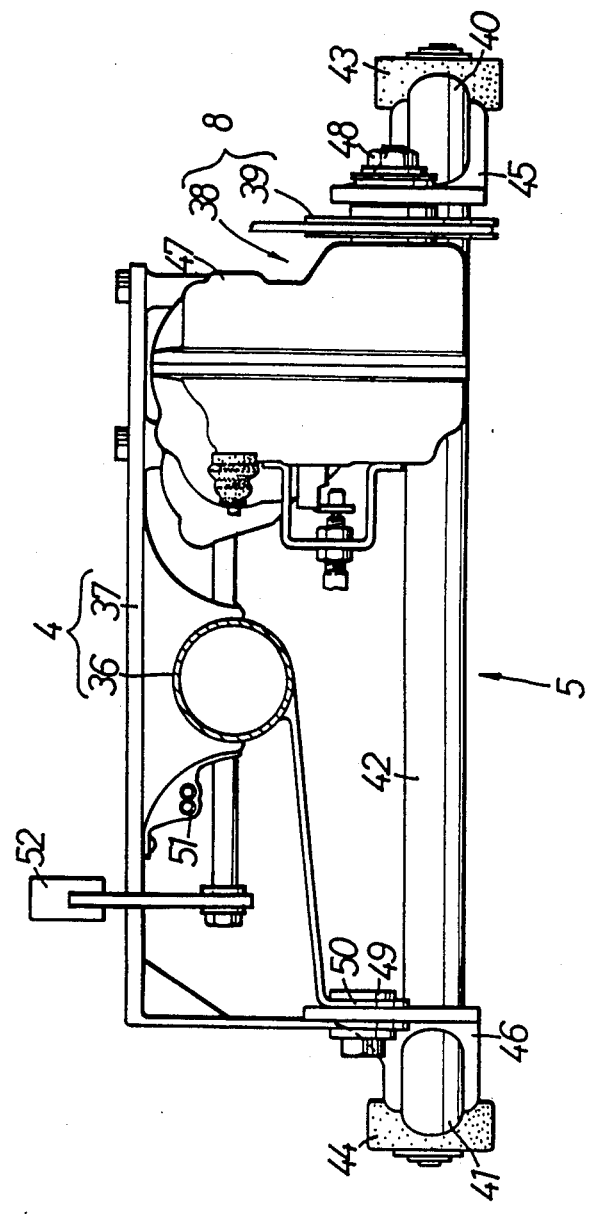
FIG. 7 is a longitudinal sectional view, taken along the line VII—VII of FIG. 6.

In FIGS. 6 and 7, a floor base 37 is secured to a longitudinally extending piped main frame 36 substantially at the longitudinal center of the frame 4, and the operation unit 8 is disposed on the main frame 36 and the floor base 37. The operation unit 8 has a power unit 38 including an electric motor 10 and a cable disk 39 coupled with the cable 30. The main stand 5 is formed substantially in U shape formed by coupling a pair of legs 40 and 41 parallel with each other through a connector 42, and smalldiameter wheels 43, 44 are supported at the ends of the legs 40 and 41, respectively.

A supporting arm 45 is fixedly secured to the coupling portion of the connector 42 and one leg 40, and a supporting arm 46 is fixedly secured to the coupling portion of the connector 42 and the other leg 41. The arm 45 is supported rotatably around a horizontal axis by a casing 47 of the power unit 38, and secured to the end of a rotational shaft 48 projected from the side of the casing 47. The other arm 46 is secured to a rotational shaft 49 supported rotatably around the same axis as the shaft 48 on a support 50 integral with the frame 36 and the base 37. Therefore, the main stand 5 is rotated around the axes of the shafts 48 and 49 by rotating the one shaft 48.

The shafts 48, 49 are disposed under the base 37, and a coolant hose 51 for cooling an engine and a brake system including a brake pedal 52 are arranged in the space between the base 37 and the main stand 5.

Figure 8:
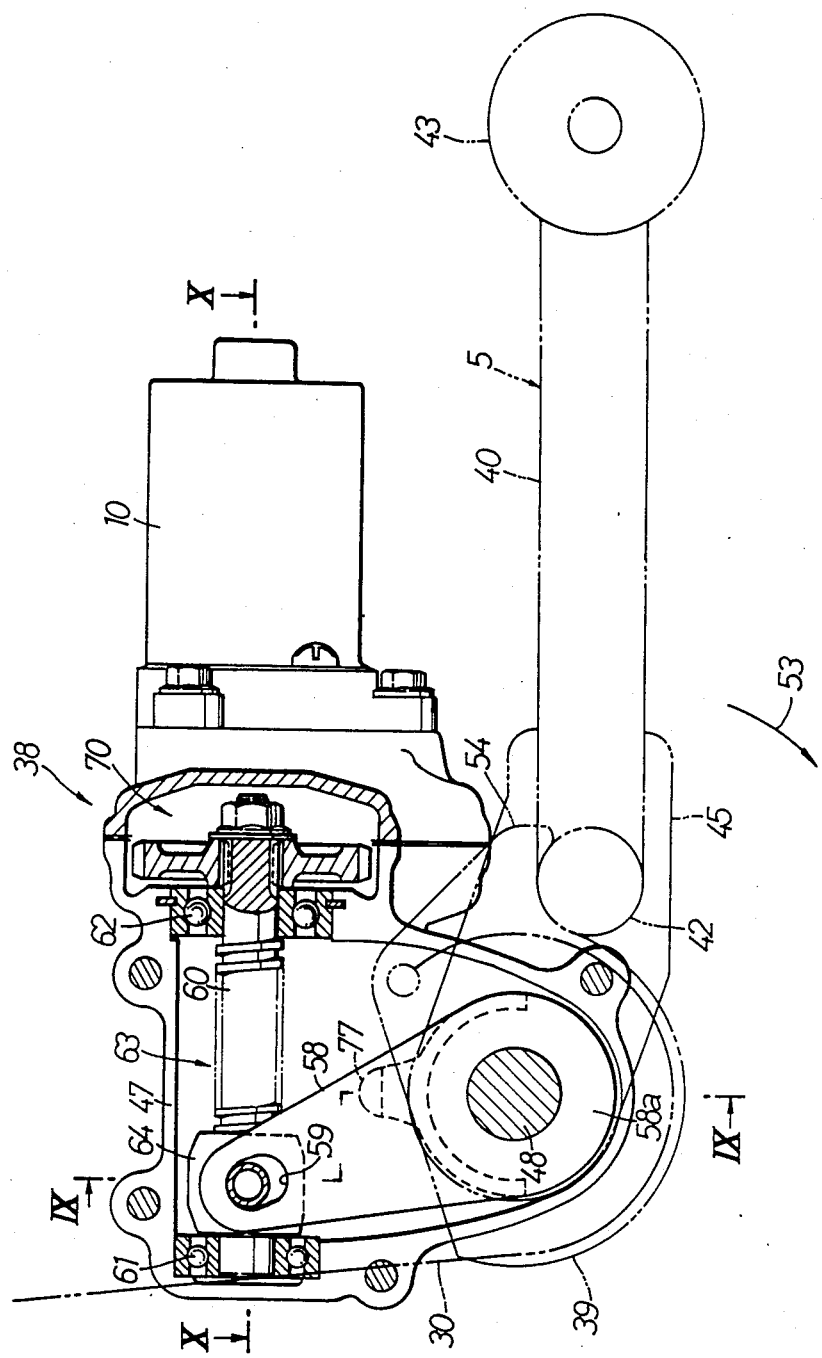
FIG. 8 is an enlarged longitudinal sectional view showing the interior of a power unit.
Figure 9:
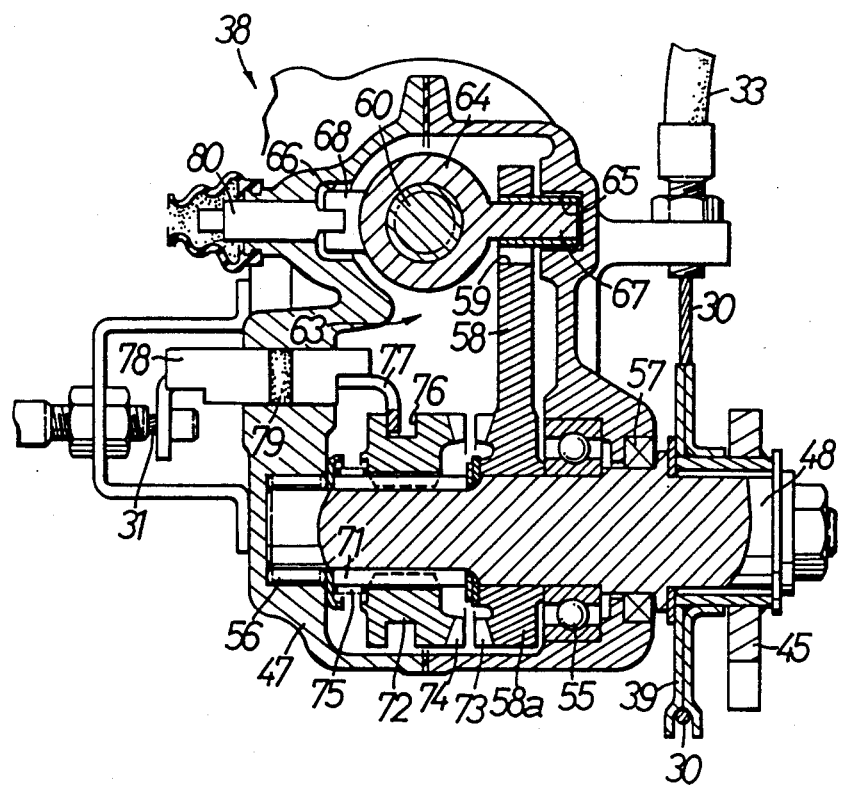
FIG. 9 is a longitudinal sectional view, taken along the line IX—IX of FIG. 8.

Referring to FIGS. 8, 9 and 10, the disc 39 is secured to the shaft 48 between one arm 45 and the casing 47. The cable 30 extended from the drive unit 7 is wound over more than half part of the outer periphery of the disc 39, and the end of the cable 30 is coupled with the disc 39. The winding direction of the cable 30 is set such that the disc 39 rotates in the same direction as the standing direction 53 of the main stand 5 when the cable 30 is pulled upward by the drive unit 7. An engaging part 54 is provided integrally with the disc 39 so as to come in contact with and engage with that portion of the connector 42 of the main stand 5 near the leg 40 from the rear side of the connector 42 along the standing direction 53. Consequently, as the cable 30 is pulled upward by the drive unit 7, the main stand 5 is rotated in the standing direction 53 through the disc 39.

The casing 47 of the power unit 38 is fixedly supported by the frame 36 and the base 37. The shaft 48 is rotatably supported at the side wall of the casing 47 via bearings 55 and 56, and the projected portion of the shaft 48 from the casing 47 is sealed by a seal member 57.

The base 58a of a rocker arm 58 is supported relatively rotatably to the shaft 48 in the casing 47, and a long hole 59 extended along the radial direction of the shaft 48 is perforated in the end of the arm 58. Drive force transmitting means 63 for transmitting the power of the motor 10 to the arm 58 is provided in the casing 47. In other words, a threaded rod 60 extending horizontally in a direction perpendicular to the axis of the shaft 48 is rotatably supported in the casing 47 upwardly of the shaft 48 via bearings 61 and 62. Trapezoidal threads are formed on the outer periphery of the rod 60, and a slide piece 64 is engaged in mesh with the threads of the rod 60. Guide slots 65 and 66 extending in parallel with the rod 60 are formed on the inner surface of the casing 47 at both sides of the rod 60. A restricting projection 67 engaged within one slot 65 through the long hole 59 of the arm 58 and a restricting projection 68 engaged within the other slot 66 are formed integrally with the slide piece 64. Accordingly, the piece 64 is restricted its rotating movement around the axis of the rod 60, and performs a telescoping movement along the rod 60 in response to rotation of the rod 60. The arm 58 is rocked around the shaft 48 by the telescoping movement of the piece 64.

The motor 10 is mounted in the casing 47, and an output shaft 69 of the motor 10 is coupled with the end of the rod 60 through a reduction gear train 70. Thus, the rod 60 is rotatably driven at a reduced gear ratio determined by the gear train 70. The motor 10 can be switched between the normal rotation and the reverse rotation, and when the motor 10 is rotated normally, the piece 64 is moved rightwardly in FIG. 8, while when the motor 10 is reversely rotated, the piece 64 is moved leftwardly in FIG. 8.

A spline 71 is formed on the shaft 48 between the arm 58 and the bearing 56, and a shifter 72 is engaged with the spline 71. Accordingly, the shifter 72 is allowed to move axially of the shaft 48, but inhibited to rotate relatively to the shaft 48.

Figure 11:
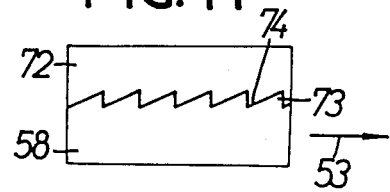
FIG. 11 is an enlarged side view showing the engaged state of a ratchet gear.

In FIG. 11, ratchet gears 73 and 74 are formed on the opposed surfaces of the arm 58 and the shifter 72 to be engaged with each other. The gears 73 and 74 are so formed to transmit the rotary power of the arm 58 to the shifter 72 only when the arm 58 is rotated in the standing direction 52 around the shaft 48 at the normal rotation of the motor 10. Thus, when the shifter 72 rotates in the standing direction 52 together with the shaft 48, the gears 73 and 74 are slid from each other, and the rotary power of the shifter 72 is not transmitted to the arm 58.

A coiled spring 75 is inserted between the shifter 72 and the inner surface of the casing 47 to surround the shaft 48, and the spring 75 urges the shifter 72 to approach to the arm 58, i.e., in a direction that the both ratchet gears 73, 74 are engaged with each other. An annular groove 76 is formed on the outer periphery of the shifter 72, and a fork 77 of substantially U shape is always engaged within the groove 76. This fork 77 is formed integrally with a displacing unit 78 movably passing in parallel with the shaft 48 through the side wall of the casing 47, and the end of the cable 31 extended from the drive unit 7 is coupled with the outer end of the unit 78. A sealing member 79 is inserted between the outer surface of the unit 78 and the side wall of the casing 47, thereby preventing water or dusts from entering the casing 47.

The cable 31 is weakened at the towing force when the lever 9 in the drive unit 7 is rotated in the rotating direction 20, and the shifter 72 is in response to the weakened force moved toward the arm 58 by the tension of the spring 75, whereby the ratchet gears 73, 74 are engaged. On the other hand, when the lever 9 is rotated reversely to the rotating direction 20 to strengthen the towing force of the cable 31 in the drive unit 7, the shifter 72 is moved in a direction separating from the arm 58 against the tension of the spring 75.

A limit switch 80 is arranged on the side wall of the casing 47 so as to face the end of the slot 66 on the side separated from the motor 10. The switch 80 comes into contact with the projection 68 of the piece 64 and is turned off in the state shown in FIGS. 8 to 10 when the piece 64 is moved on the rod 60 to the end of the rod apart from the motor 10. Further, when the main stand 5 is disposed in the stored state, the piece 64 is disposed in this state, and when the motor 10 is rotated normally to move the piece 64 to the right side of FIG. 8, the switch 80 is conducted due to the disconnection from the projection 68.

Figure 12:
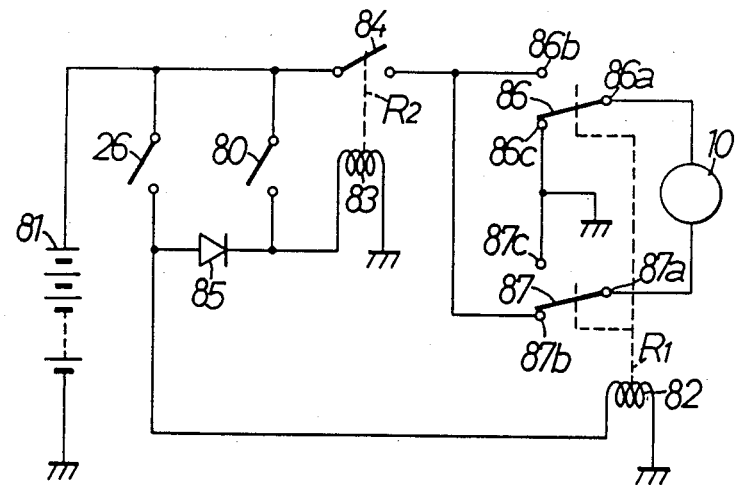
FIG. 12 is a circuit diagram of a control circuit for controlling an electric motor.

FIG. 12 shows an electric control circuit for controlling the operation of the motor 10. The anode of a battery 81 is grounded through a motor switch 26 and the relay coil 82 of a first relay $R_1$, and a series circuit consisting of the switch 80 and the relay coil 83 of a second relay $R_2$ is connected in parallel with a series circuit consisting of the switch 26 and the relay coil 82. A relay coil 83 and a relay switch 84 which constitutes the relay $R_2$ are connected to the connecting points of the switch 26 and the switch 80, and the switch 84 is conducted in response to the energization of the coil 83. The switch 26 is connected to the relay coil 82 and the switch 80 is connected to the relay coil 83 both through a diode 85 which allows the flow of current only from the switch 26 to the relay coil 82.

On the other hand, a pair of relay switches 86 and 87 are operated by the coil 82 in the relay $R_1$. Further, the switches 86, 87 have common contacts 86a, 87a, and pairs of individual contacts 86b, 86c; 87b, 87c, respectively, and the common contacts 86a, 87a are connected to the both terminals of the motor 10. In the switches 86, 87, one individual contacts 86b, 87b are connected to the switch 84, and the other individual contacts 86c, 87c are grounded. In this relay $R_1$, when the coil 82 is deenergized, the common contacts 86a, 87a of the switches 86, 87 are connected with the contacts 86c, 87b and when the coil 82 is energized, the common contacts 86a, 87a are connected with the other contacts 86b, 87c.

Figure 13:
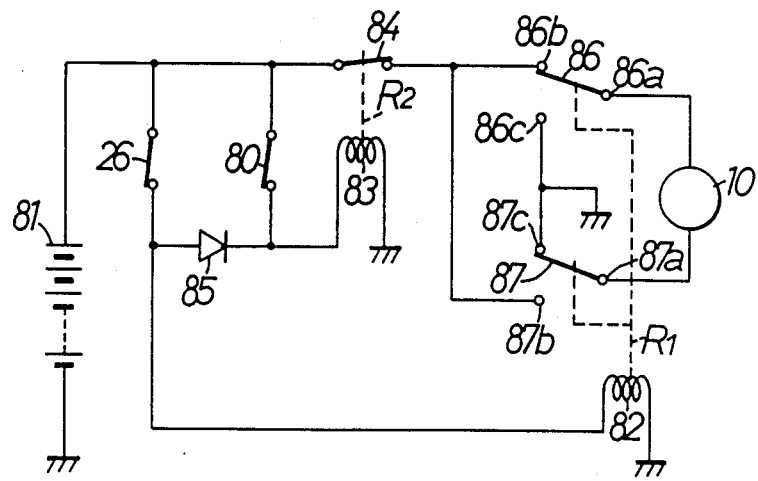
FIGS. 13 and 14 are circuit diagrams of a control circuit corresponding to FIG. 12 describing the operation of the control circuit.
Figure 14:
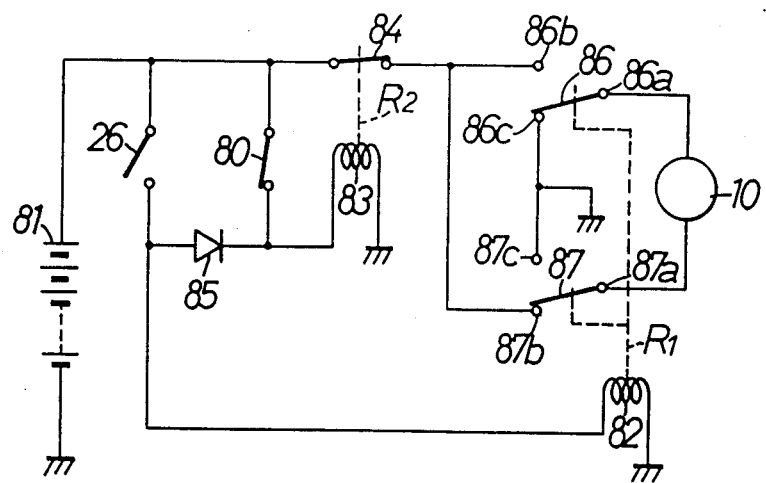

In this control circuit described above, when the switch 26 and the switch 80 are conducted, the coil 82 of the relay $R_1$ is energized, and the common contacts 86a, 87a of the switches 86, 87 are conducted with one individual contacts 86b, 87c, as shown in FIG. 13. Then, the coil 83 of the relay $R_2$ is energized, and the switch 84 is conducted. Thus, the motor 10 rotates normally. When the switch 26 is interrupted in this state, the coil 82 of the relay $R_1$ is deenergized as shown in FIG. 14, the common contacts 86a, 87a of the switches 86, 87 are connected with the other contacts 86c, 87b, and the motor 10 is rotated reversely.

The operation of this embodiment will now be described. When the main stand 5 is disposed in the stored state, the lever 9 of the drive unit 7 is disposed at the lowermost position, and the switch 26 is interrupted.

The slide piece 64 of the operation unit 8 is at the position farthest from the motor 10, and the switch 80 is interrupted. When the lever 9 is rotated in the rotating direction 20 so as to stand the main stand 5 in this state, the disc 39 is rotated through the cable 30, and the main stand 5 is rotated from the stored state toward the standing direction 53 in response to the rotation of the disc 39. In this case, since the cable 31 is depressed down, the shifter 72 is moved by the tension of the spring 75 to the arm 58 side. When the main stand 5 is rotated by the lever 9, the shaft 48 is also rotated in the standing direction 53 to rotate the shifter 72 similarly, but both ratchet gears 73, 74 are slid from each other, and the rotary power of the shaft 48 is not transmitted to the arm 58. Therefore, the main stand 5 can be smoothly rotated toward the standing direction 53.

When the main stand 5 comes in contact with the ground, the force for pulling the cable 30 is increased, but the lever 9 can be rotated slightly relatively toward the rotating direction 20 with respect to the lever 12. When the lever 9 is slightly advanced in the rotating direction 20 with respect to the lever 12, the switch 26 is conducted. Thus, the relay coil 82 of the relay $R_1$ and the coil 83 of the relay $R_2$ are excited, and the motor 10 is rotated normally. Accordingly, the rod 60 is rotated, the piece 64 is moved toward the motor 10 side, and the switch 80 is conducted. The arm 58 is rotated around the axis of the shaft 48 by the movement of the piece 64. In this case, the ratchet gear 73 of the arm 58 and the ratchet gear 74 of the shifter 72 are engaged with each other. Therefore, the rotary power of the arm 58 is transmitted to the shaft 48 through the shifter 72. Consequently, the drive force of the motor 10 is transmitted to the shaft 48, and the main stand 5 is thereafter rotated by the manual power of the lever 9 and the drive force of the motor 10 in the standing direction 53.

If the driver takes off his hand from the lever 9 or the force for rotating the lever 9 is weakened under the conditions that the ground surface where the main stand 5 is to be stood is irregular after the main stand 5 is contacted with the ground, the lever 9 is returned to the rear side along the rotating direction 20 by the tension of the spring 24 by the amount corresponding to the advancement of the lever 9 in the rotating direction 20 with respect to the lever 12. Thus, the switch 26 is interrupted, and the motor 10 is reversely operated as shown in FIG. 14.

In this case, when the driver takes off his hand from the lever 9, the engaged state of the ratchet gears 73, 74 are disengaged, and the main stand 5 is returned to the original position. When the driver only looses his hold without taking off his hand from the lever 9, the gears 73, 74 remain engaged, and the main stand 5 is slowly returned to the original position along with the reverse operation of the motor 10.

When the main stand 5 reaches a vertical state so that the lift of the scooter 1 is completed, the lever 9 is rotated to the highest position and contacts with the stopper 34. Then, the main stand 5 is rotated into the standing state with the aid of additional weight of the scooter 1 itself. In this case, since the arm 15 is not rotated due to the stop of the rotating lever 9 while the disc 39 continues rotating, the tension of the cable 30 decreases. Therefore, the lever 12 is returned by the tension of the spring 24 to the original phase, and the arm 13 is slightly rotated in the rotating direction, and contacted with the stopper 35. Thus, the switch 26 is interrupted, and the motor 10 starts rotating reversely. The piece 54 is returned to the original position by the reverse rotation of the motor 10, the switch 80 is interrupted, and the motor 10 stops rotating. When the piece 64 is returned to the original position, the gear 73 of the arm 58 slides on the gear 74 of the shifter 72 so that the rotary power of the arm 58 is not transmitted to the shaft 48. When the motor 10 is thus stopped, the gears 73 and 74 are engaged with each other. Consequently, even if the scooter 1 is pushed forward, the shaft 48 is not rotated, and the standing state of the main stand 5 is maintained.

In order to release the standing state of the main stand 5, the lever 9 may be returned to the original position. Thus, the arm 15 is returned to the original position, the disc 39 is returned to the original state, and the shifter 72 is separated from the arm 58. The arm 13 is returned by the tension of the spring 27 to the original state. Then, the main stand 5 may be returned by the normal operation. Thus, the main stand 5 is returned to the stored state, and the scooter 1 may run.

Figure 15:
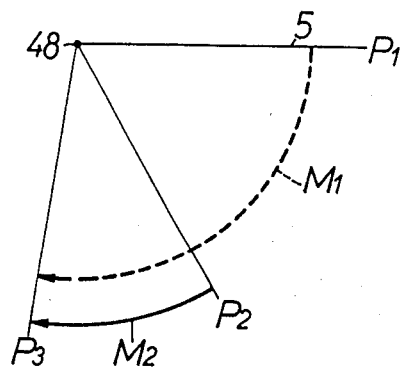
FIG. 15 is an explanatory view for simply describing the operation.

The operation of this embodiment will be described in a simplified manner as shown in FIG. 15. The main stand 5 disposed in a stored state $P_1$ is rotated by manual power $M_1$ designated by broken lines until reaching a ground contacting position $P_2$, and rotated by both the manual power $M_1$ and the drive force $M_2$ of the motor 10 designated by solid lines from the ground contacting position $P_2$ to a standing state $P_3$.

Figure 16:
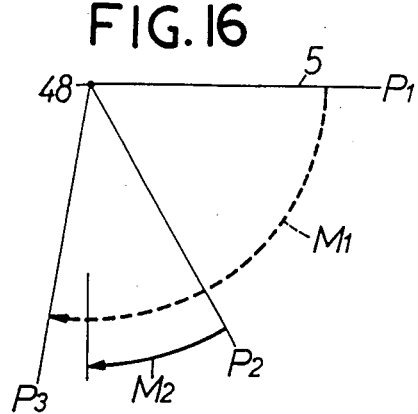
FIGS. 16, 17, 18 and 19 are explanatory views corresponding to FIG. 15 showing modified embodiments of the main stand device according to the present invention in combination with the manual power and the drive force of the motor.
Figure 18:
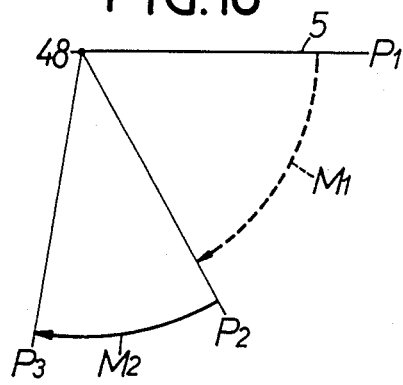
Figure 17:
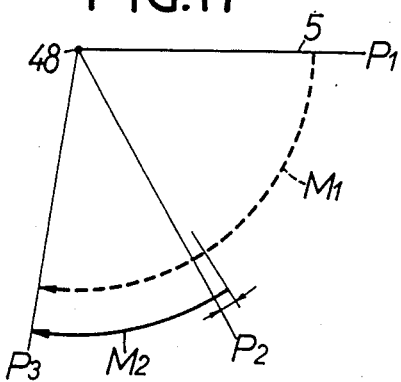
Figure 19:
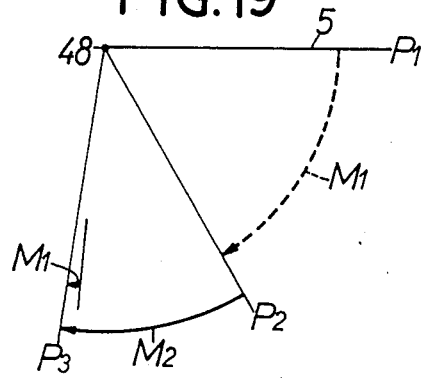

As modified embodiment of the above embodiment as shown in FIG. 16, when the main stand 5 reaches the vertical state, the motor 10 can be stopped to reduce the power consumption of the motor 10. As shown in FIG. 17, the motor 10 may be operated before the main stand 5 reaches the ground contacting position $P_2$. Further, as shown in FIG. 18, the manual power $M_2$ is employed only in the range where relatively small operating force is required until the main stand 5 is contacted with the ground, and the drive force of the motor 10 may be used in the range that the large operating force is required from the ground contacting position $P_2$ to the standing state $P_3$. In this case, the time when the standing operation of the main stand 5 is completed cannot be sensed from the actuator, but the main stand 5 can be stood with a light operating force and in a short time. FIG. 19 shows a further modified embodiment of the embodiment shown in FIG. 18. The manual power $M_1$ is jointly used with the motor force immediately before the main stand 5 reaches the standing state $P_3$. Thus, the actuator can be operated immediately before the main stand 5 reaches the standing state $P_3$, and the completion of the standing operation of the main stand 5 can be confirmed by the actuator.

Figure 20:
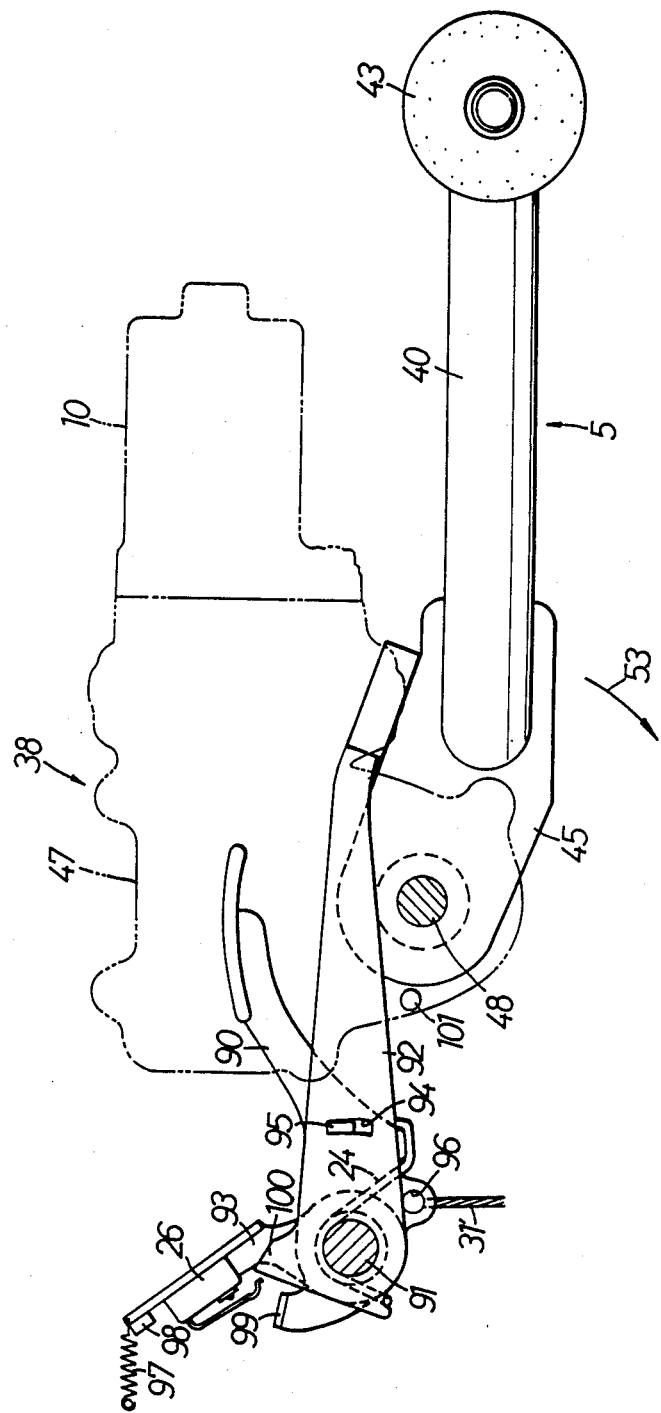

FIG. 20 shows still another embodiment of the present invention, wherein the same reference numerals as those in the abovementioned embodiment designate the same or equivalent members and elements. This embodiment may be applied to a relatively heavy two-wheeled motorcycle. A foot pedal 90 is used as an actuator to be operated by a foot.

A main stand 5 is fixedly secured through a supporting arm 45 to a rotational shaft 48 of a power unit 38 in the same manner as the abovementioned embodiments. A foot pedal 90 as an actuator, a push arm 92 and a switch arm 93 are pivotally secured to a pivot shaft 91 fixed to a body frame (not shown) in parallel with and in front of the shaft 48.

The pedal 90 and the arm 92 are extended rearward from the shaft 91, and the rear end of the arm 92 is engaged with the main stand 5 from the rear along the standing direction 53. A torsion spring 24 is provided between the pedal 90 and the arm 92, the arm 92 is urged by the tension of the spring 24 toward the standing direction 53, and the pedal 90 is urged reversely to that direction. An arcuate long hole 94 is perforated in an intermediate portion of the arm 92 so as to have its center at the shaft 91, and an engaging projection 95 engaged within the hole 94 is projected on the pedal 90. Further, the width of the projection 95 is set shorter than the length of the long hole 94. Thus, when the main stand 5 is disposed in the stored state, the pedal 90 is inclined upward to a position at which the projection 95 is in contact with the rear end of the hole 94 along the standing direction 53. Further, a hole 96 for coupling the cable 31' is perforated in the foot pedal 90 so as to allow the cable 31' to move the shifter 72 of the power unit 38, and when the pedal 90 is depressed to rotate in the standing direction 53, the cable 31' operates so that the shifter 72 approaches the arm 58 (Refer to FIG. 9.).

The switch arm 93 is urged in the reverse direction to the standing direction 53 by a spring 97, and restricted its rotation by a stopper 98. A contacting projection 99 is formed at the front end of the pedal 90 along the longitudinal direction of the motorcycle in order to contact with the switch 26 stationarily supported on the arm 93 and make the switch 26 conducted. A pressing unit 100 for abutting and pressing the arm 93 is provided at the front end of the arm 92. Further, a stopper 101 for restricting the rotation of the pedal 90 forward along the standing direction 53 by abutting against the lower portion of the pedal 90 is projected from the casing 47 of the power unit 38.

The operation of this embodiment will be described. To stand the main stand 5, the pedal 90 is depressed by a foot, and pressed down toward the standing direction 53. The rotating operation of the pedal 90 is transmitted to the arm 92 through the spring 24, and the arm 92 is rotated. Therefore, the main stand 5 starts rotating from the stored state in the standing direction 53.

Figure 21:
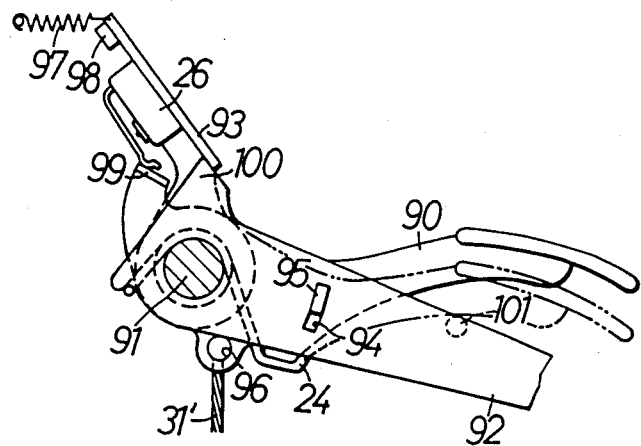

In FIG. 21, when the main stand 5 is contacted with the ground, the rotary resistance of the arm 92 increases. At this time, the pedal 90 can rotate relatively to the arm 92 as designated by chain lines in FIG. 21 until the projection 95 of the pedal 90 comes in contact with the front end of the hole 94 along the standing direction 53. When the pedal 90 is depressed, the projection 99 is contacted with the switch 26, and the switch 26 is conducted. In this case, the unit 100 of the arm 92 is contacted with the arm 93.

When the switch 26 is conducted, the motor 10 starts operating, and the shaft 48 starts rotating toward the standing direction 53 by the drive force of the motor 10 through the operation of the same power unit 38 as that in the embodiments described above.

Figure 22:
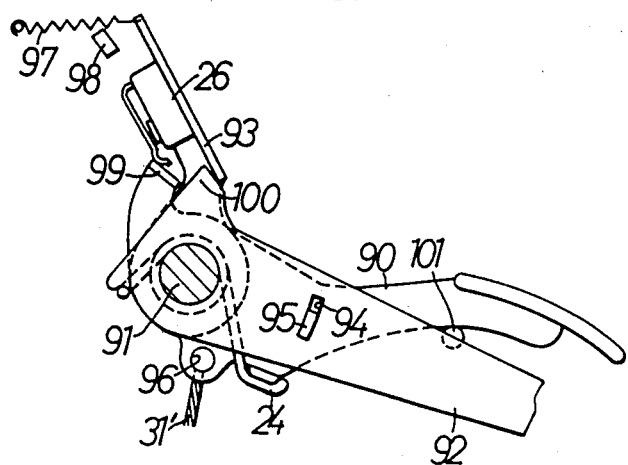

As shown in FIG. 22, the arm 93 is pressed by the unit 100 and separated from the stopper 98 in the state that the pedal 90 is contacted with the stopper 101, while the projection 99 is in contact with the switch 26 and the switch 26 is kept conducted. Therefore, the operation of the motor 10 is continued.

If the foot is released from the pedal 90 when the standing operation of the main stand 5 is completed, the pedal 90 is rotated by the tension of the spring 24 reversely to the standing direction 53 until the projection 95 is contacted with the rear end of the long hole 94 along the standing direction 53, and the conducted state of the switch 26 by the projection 99 is released. Therefore, the motor 10 is stopped and the standing operation of the main stand 5 is completed.

Thus, in the embodiment described above, the standing operation of the main stand 5 is performed by the manual power due to the depression of the pedal 90 by the foot until the main stand 5 contacts with the ground in the same manner as shown in FIG. 18 described above, and the main stand 5 is driven, after contacted with the ground, only by the drive force of the motor 10.

In the embodiments described above, the motor 10 is used as a drive source. However, the present invention is not limited to the disclosed embodiments. For example, the drive source may be embodied as a hydraulic cylinder.

According to the present invention as described above, the main stand is fixedly secured to the rotational shaft rotatably supported on the body frame, the shaft and the drive source for rotatably driving the shaft are coupled together so as only to transmit the power from the drive source to the shaft, and the drive source is started its operation to rotate the main stand in a direction toward the standing position in response to the operation of the actuator which is operated to rotate the main stand until it comes in contact with the ground or it comes to a position immediately before contact with the ground. Therefore, when a relatively small force is enough for operating the main stand, the main stand is operated for rotation by the manual power, and when a large operating force is required therefor, the main stand is rotated by both the manual power and the drive force of the drive source or solely by the drive force of the drive source to stand the main stand. Consequently, any large operating force is no longer required to stand the main stand. Further, since the drive power is not used in a range where a relatively small operating force is required, the rotation of the main stand can be rapidly performed in that range, and the time required for standing the main stand can be entirely shortened.

What is claimed is:

1. A main stand device for a two-wheeled motorcycle having a body frame, comprising:
   a main stand pivotally secured to the body frame for rotation between a stored state and a standing state,
   an actuator operatively coupled with said main stand and rotatably provided on the body frame, said actuator being manually operable to rotate said main stand,
   said main stand being fixedly secured to a rotational shaft rotatably supported on the body frame,
   a drive source coupled to said rotational shaft by a power transmission control means which is adapted to transmit a drive force only in a direction from the source to the shaft for rotatably driving the shaft, said drive source being constructed to start operation thereof automatically for rotating said main stand in a direction toward its standing state in response to operation of said actuator when said main stand is rotated from its stored state to a position in contact with the ground or immediately before contact with the ground.

2. The main stand device as claimed in claim 1 wherein said actuator is associated with a switch mechanism, said switch mechanism detecting a predetermined amount of operation of the actuator thereby to cause the drive source to feed the drive force to the rotational shaft.

3. The main stand device as claimed in claim 1, wherein said power transmission control means includes a drive source side member and a rotational shaft side member, these members having ratchet gears engageable with each other, said ratchet gears allowing in their engaged state relative rotative movements of the members in one direction.

4. The main stand device as claimed in claim 3, wherein said power transmission control means further includes a spring member which is operatively connected with said actuator and is adapted to urge the ratchet gears into an engaged state when said actuator is being rotated to a position causing said main stand to be rotated to the standing state.

5. The main stand device as claimed in claim 3, wherein said drive source is a motor which is switchable in its rotation between a normal direction and a reverse direction, said drive source side member being relatively rotatable around the rotatable shaft between a first position and a second position and being driven by normal rotation of said motor toward said first position moving said main stand toward the standing state and also being driven, when said main stand is in standing state, toward said second position by reverse rotation of the motor.

6. The main stand device is claimed in claim 1, wherein said actuator is an operating lever located near a steering member for the motorcycle.

7. The main stand device as claimed in claim 1, wherein said actuator is a foot pedal.

8. The main stand device as claimed in claim 2, wherein a sub lever is disposed rotatable around a shaft together with said actuator but permitted a relative rotative movements therebetween within a limited range through an intermediary of a torsion spring which is disposed between the sub lever and the actuator, rotative movements of the sub lever being transmitted to said main stand through a linkage, said switch mechanism includes a first switch disposed around said shaft and capable of being conducted by rotative movements of said actuator relative to said sub lever thereby to actuate said drive source.

9. The main stand device as claimed in claim 8, wherein said linkage includes a link arm with opposite ends which is swingable around a pivot located in a midway portion of the arm and which has one of the opposite ends connected via a first cable to the main stand and has the other end operatively connected via a second cable to said power transmission control means.

10. The main stand device as claimed in claim 9, wherein said power transmission control means includes ratchet gears which are engageable with each other and are capable of making slip during relative rotation therebetween in one direction, these ratchet gears being alternately placed in an engaged state and a disengaged state in response to swinging motion of said link arm.

* * * * *